Feb. 25, 1947.   H. M. HUCKLEBERRY   2,416,393
INDUCTOR
Filed Sept. 23, 1944
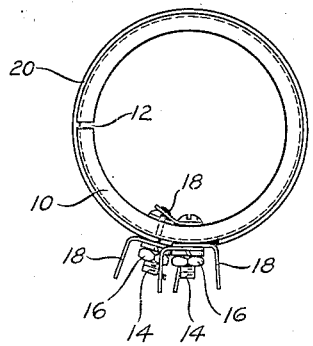
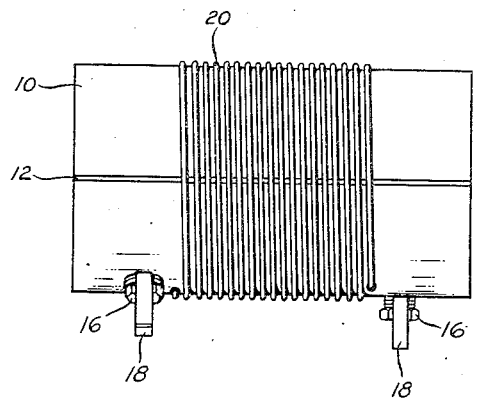
INVENTOR
HARRY M. HUCKLEBERRY
BY
AGENT Patented Feb. 25, 1947

2,416,393

UNITED STATES PATENT OFFICE 2,416,393

INDUCTOR

Harry M. Huckleberry, Rodgers Forge, Md., assignor to Bendix Aviation Corporation, South Bend, Ind., a corporation of Delaware Application September 23, 1944, Serial No. 555,549

8 Claims. (Cl. 175—359)

This invention relates to inductors and more particularly to a high frequency inductor having a temperature coefficient which is substantially constant and free from discontinuities.

There are many applications in which an extremely stable source of high frequency energy is required, as, for example, in the reception and transmission of radio signals on predetermined channels. In certain classes of equipment, it is impossible to employ the very efficient quartz resonator for the purpose of stabilizing the vacuum tube oscillator usually found in this application, because of the need for continuous tuning over the signal band, forcing the use of inductance-capacitance combinations which afford a more conveniently adjustable frequency determining combination. Arrangements are known whereby the effect of variations in the electrode supply voltages on the operating frequency may be rendered negligible, leaving only the problem of coping with frequency changes produced by various ambient temperatures. These thermally produced changes are generally the result of alterations in the mechanical configuration of the frequency determining elements and are of such a nature that the frequency-temperature characteristic most frequently has a negative slope. For example, an increase in temperature enlarges the dimensions of both inductors and capacitors, thus increasing their inductance or capacitance, as the case may be, and decreasing the resonant frequency of the circuit combination. Present engineering practice is to combat this undesired frequency shift by the use of negative temperature coefficient capacitors which are added in the amount required to counteract the negative frequency drift. The capacitors available for this purpose all have a smooth temperature-capacity variation characteristic, and consequently, for perfect compensation, it is absolutely essential that the variation characteristics of the other elements in the circuit be smooth also, and free from irregularities and discontinuities.

Most capacitors used for tuning purposes have sufficiently smooth characteristics, but in inductors, only those consisting of air core coils or of wire coils wound on core materials having thermal expansion coefficients equal to the thermal coefficient of the wire are suitable for this exacting application. Such a limitation in the choice of core and form materials necessarily limits the engineer in his designs, possibly forcing him to use materials unsuitable for the design frequency range. When the wire and the form on which it is wound have different expansion characteristics, a change in ambient temperature from the temperature at which the coil was wound, causes a change in the relative length of the coil helix and the circumference of the form carrying the helix. So long as the temperature produced change is small, the tendency of the helix to slip over the surface of the form is overcome by the friction between the form and the helix, a stress being thereby produced in the wire. With a further increase in temperature, the stress in the wire increases to a point where it overcomes the frictional restraint and the coil dimensions are suddenly altered in the resulting movement so that it assumes a new inductance value. Such a sequence of events results in a temperature-inductance characteristic of smooth, substantially parallel sections joined by erratic discontinuities, which characteristic is not retraced as the ambient temperature is cycled. There is no known means for accurately temperature-compensating an oscillatory circuit including an element having such non-linear characteristics. An attempt to solve the problem has been made by winding wire under tension on the conventional form, it being reasoned that so long as the wire is under sufficient tension no slippage can occur. This expedient, however, merely mitigates against the discontinuities over a somewhat more extended temperature range than in the earlier described coil structures and still permits them to occur when it is attempted to use the inductor over the extreme ranges of temperature encountered in the operation of modern aircraft, which may leave the ground after long exposure to the sun in the tropics and ascend within a few minutes into the frigidity of the stratosphere.

Accordingly, one of the principal objects of the invention is to provide a new and novel inductor having a smooth and continuous temperature-inductance characteristic in the temperature range —55° C. to 85° C.

Another object of the invention is to provide a new and novel multiple-turn inductor in which the length changes occurring within each turn are absorbed in that turn without becoming cumulative over the entire structure.

A further object of the invention is to provide a new and novel inductor in which temperature changes cannot cause sudden movement of the wire helix over the surface of the coil form.

Other objects and advantages of the invention will in part be described and in part be obvious when the following specification is read in conjunction with the drawings in which:

Figure 1 is a top view of the completed coil assembly and

Figure 2 is an end view of the said assembly.

Generally speaking, the apparatus described herein attains the desired objects through the use of a longitudinally slotted tubular coil form which is stressed in a fixture to partially close the slot during the winding operation and released thereafter. The wire forming the coil is thus placed under tension, and in the presence of temperature induced variations in the wire dimensions, the spring of the form material takes up these changes in each individual turn, rather than permitting the total deformation of the wire to become cumulative and force the free end thereof over the surface of the form.

Referring now to the drawings, there is incorporated in the assembly the tubular form 10, for illustrative purposes considered of steatite, which is longitudinally slotted along its entire length as indicated at 12. The form 10 is also provided with apertures which receive the screws 14 used in conjunction with the nuts 16 to secure the soldering lugs 18 in place on the form. The surface of the form 10 is helically grooved to receive the turns of wire placed thereon to form the coil 20. The free ends of this coil 20 are brought inside the form through openings present for this purpose and soldered to the internally situated soldering lugs 18.

In the fabrication of the coil assembly, the form 10 may be placed in a fixture placing it under sufficient stress to reduce the dimension of the slot 12 appreciably from its normal value. One end of the wire to form coil 20 is now affixed to one of the internal soldering lugs 18 by soldering, and the required length then wound on the form, placing it in the grooves provided for that purpose, after which the other wire end is passed through to the interior of the form and attached to the solder lug 18 corresponding thereto. The assembly is now completed and it may be removed from the fixture. Upon so doing, the form 10 springs outward from its deformed condition and places each turn of the coil 20 individually under tension.

Assuming now, that the form material and the metal constituting the wire have differing temperature coefficients and that there is a change in ambient temperature, the circumference of the form and the length of each turn will change at different rates. Were there no slot in the form and were one end of the helix fixed, the total difference in equilibrium positions at the free end of the coil would be equal to the discrepancy in each turn multiplied by the number of turns. Under such conditions, with a sufficient temperature change, an ultimate, relatively large change in the relative position of the wire and the form is inevitable. In the arrangement shown, however, each turn of wire changes by the same amount in length, altering the stress therein and permitting the slot to become wider or forcing it to become narrower, thus permitting individual compensation for the change of length of each turn with respect to the circumference of the coil form 10 and preventing the relative dimensional change from becoming cumulative, which would ultimately force a discontinuous equalizing movement.

In practice, the use of a slot having a width equal to at least 0.5% of the circumference of the form compressed during the winding operation by an amount equal to at least 0.1% of the circumference of the form has been found satisfactory.

It will be obvious that many changes and modifications may be made in the invention without departing from the spirit thereof as expressed in the foregoing description and in the appended claims.

I claim:
1. An inductor comprising in combination, a longitudinally slotted form, and a wire helically wound thereon having a tension sufficient to reduce the slot dimension an amount equal to at least 0.1% of the circumference of said core.

2. An inductor comprising in combination, a longitudinally slotted cylindrical form having helical grooves thereon, and a wire wound in said grooves having a tension sufficient to reduce the slot dimension an amount equal to at least 0.1% of the circumference of said core.

3. An inductor comprising in combination, a longitudinally slotted cylindrical form having helical grooves thereon and a predetermined thermal expansion coefficient, and a wire of material having a thermal expansion coefficient greater than that of said core wound in said grooves with a tension sufficient to reduce the slot dimension an amount equal to at least 0.1% of the circumference of said core.

4. An inductor comprising in combination, a tubular member of insulating material having a slot parallel to the axis from end to end thereof, said insulating material having a predetermined thermal expansion coefficient, and a wire of material having a thermal expansion coefficient greater than that of said insulating material wound about said tubular member with a tension sufficient to reduce the slot width an amount equal to at least 0.1% of the circumference of said member.

5. An inductor comprising in combination, a tubular member of insulating material having a slot having a width equal to at least 0.5% of the circumference of said member parallel to the axis of said member from end to end thereof, said insulating material having a predetermined thermal expansion coefficient, and a wire of material having a thermal expansion coefficient greater than that of said insulating material wound about said tubular member with a tension sufficient to reduce the slot width an amount equal to at least 0.1% of the circumference of said member.

6. The method of placing wire under tension on a slotted tubular form which comprises, placing said form under a stress decreasing the width of said slot, winding the wire on said form and securing it thereto, and removing said stress from said form.

7. The method of placing wire under tension on a slotted tubular form which comprises, placing said form under a stress decreasing the width of said slot, winding the wire under tension on said form and securing it thereto, and removing said stress from said form.

8. The method of placing wire under tension on a slotted tubular form which comprises, placing said form under a stress decreasing the width of said slot, winding the wire under tension on said form, and removing said stress from said form.

HARRY M. HUCKLEBERRY.

REFERENCES CITED

The following references are of record in the file of this patent:

UNITED STATES PATENTS

| Number | Name | Date |
| --- | --- | --- |
| 1,996,823 | Osnos | Apr. 9, 1935 |